Sept. 26, 1950     C. A. JOHANSSON     2,523,765
SHIFTING DEVICE FOR NUMBERING MACHINES
Filed May 13, 1944
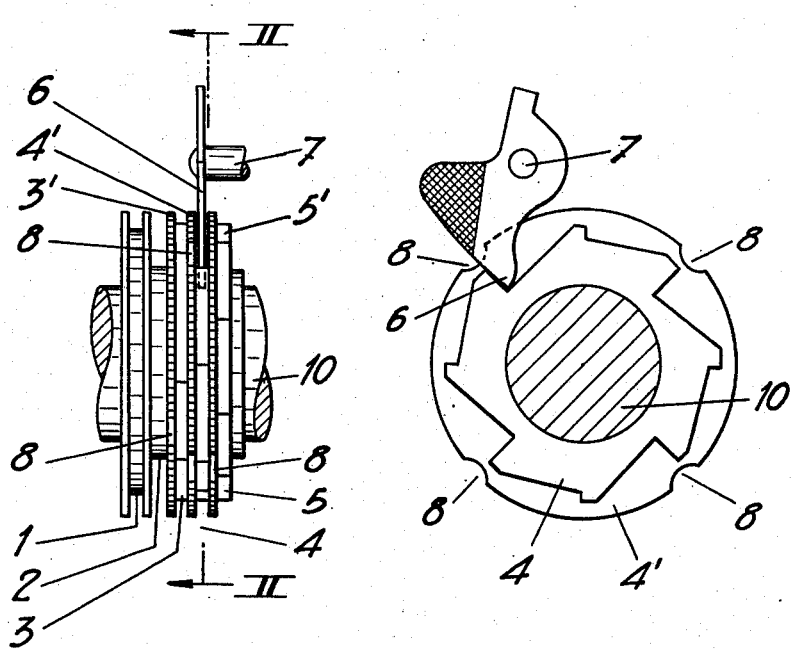

Patented Sept. 26, 1950

2,523,765

UNITED STATES PATENT OFFICE 2,523,765

SHIFTING DEVICE FOR NUMBERING MACHINES

Carl Anton Johansson, Helenelund, near Stockholm, Sweden, assignor to Aktiebolaget Cryptoteknik, Stockholm, Sweden, a joint-stock company of Sweden Application May 13, 1944, Serial No. 535,492
In Sweden June 9, 1943

5 Claims. (Cl. 101—72)

The present invention relates to numbering machines of the type having a shifting device by means of which the machine may be set either to effect a gradually progressing numbering operation or to repeat any desired number of numbers, two, three or more times.

More particularly, the invention relates to numbering machines of the said type in which the shifting device includes a set of rotatable discs and a member adapted to be controlled by any of said discs which in its turn controls the operation of the feeding means of the units wheel of the machine in different ways in dependency on the disc that happens to be engaged by said member.

In shifting the apparatus for a predetermined repeating operation which is effected by bringing the said member into engagement with the shifting disc corresponding to the repeating operation desired, said operation will not be obtained immediately, unless the shifting disc under consideration is in proper position in relation to said member.

Thus, for instance, in case of the disc for controlling a triplicate repeating operation it may happen that the number set will be repeated one or two times only instead of three times before the units wheel is advanced another step. Therefore, in order to be sure that the operation desired will be obtained, the operator should make a proof-impression on a separate paper before starting the numbering operation proper. In the meantime, however, the number desired may be passed, so that the operator has to set the numeral wheels manually until the correct number appears.

The object of the invention is to avoid said inconvenience. To this end the discs of the shifting device are provided with a mark whereby the operator may observe, when the discs are in proper position in relation to the shiftable member for starting a repeating operation desired.

Said mark may consist of a recess or notch formed in the circumference of the discs themselves or in operating flanges thereof. It is preferred to paint such recess or notches in a striking color, say red.

In the accompanying drawing, Fig. 1 is a side elevation of a shifting device to which the present invention is applied. Fig. 2 is a cross section on the line II—II of Fig. 1.

The drawing has reference to a numbering machine the shifting device of which comprises a set of individually rotatable discs mounted on the shaft of the numeral wheels of the machine or on another shaft connected therewith, and an oscillating pawl that may be shifted axially into engagement with any of said discs. Said pawl may be assumed to be secured to the shaft of the feeding member of the units wheel. The discs for controlling the various repeating operations are shaped as ratchet wheels having shallow and deep spaces in various orders. At each step the pawl advances the disc with which it is in engagement by one step. As long as the pawl during this operation only engages shallow spaces, it will prevent the feeding member of the units wheel from engaging the units wheel to operate it. As soon as the pawl enters a deep space, however, it allows the feeding member of the units wheel to engage said wheel in order to advance it one step at the next operative stroke of the pawl. According to the positioning of the shallow and deep spaces with relation to each other a duplicate, triplicate or still continued repetition of one and the same number may be effected. Thus, in order that a corresponding repetition may be obtained immediately after the shifting of the pawl from a cam disc to another has taken place it is necessary that the pawl immediately enters a deep space of said other disc.

To this end the mark should be placed so that said position may be determined without any trouble. The mark as provided on the cam discs may correspond either to an index on the pawl or to a certain portion, as for instance, an edge, thereof.

The shifting device as shown in Fig. 1 comprises a cylindrical disc 1 adapted to control an infinite repetition of each number, another cylindrical disc 2 for controlling a gradually progressing numbering operation, and a set of ratchet wheels 3, 4, 5 adapted to control, for instance, a triplicate, duplicate and quadruplicate repetition in the order stated. The last mentioned three discs are each provided with a serrated operating flange $3^1$, $4^1$ and $5^1$, respectively, at their one side (in the drawing their left hand one). All of the shifting discs 1–5 are rotatably mounted individually on a shaft, as 10, which may represent the shaft of the numeral wheels of the numbering or another shaft connected therewith.

6 designates the pawl to cooperate with the shifting discs and 7 designates the shaft of said pawl which may be the shaft of the feeding member of the units wheel, as hereinbefore stated. The shaft 7 is slidably mounted in a way not illustrated in order to allow the pawl 6 to be brought into mesh with any desired disc 1 to 5.

The repeating discs 3—5 are formed with teeth separated by shallow and deep spaces in a different order for each disc. In register with each deep space in such a disc the respective operating flange is formed with a mark, such as for instance, a recess 8 which stands right opposite the front edge of the pawl 6 when the pawl is in engagement with said deep space. The recesses 8 may, preferably, be painted in a striking color, say red.

What I claim is:

1. In a numbering stamp of the type provided with control discs having deep and shallow indentations in a given order and having a pawl cooperating with the discs to determine the number of repetitions of each numeral before advance to the next consecutive numeral, in combination, generally cylindrical members one associated with each of said discs, and indicting means on each of said cylindrical members each said means being in alignment with one of the deep indentations of the control discs whereby said control discs may be set relative to said pawl to a position such that the desired number of repetitions is procured upon the first operation subsequent to the setting.

2. In a shifting device for numbering machines, comprising a set of ratchet wheels each having shallow and deep tooth spaces in predetermined order of different pitches and a pawl adapted to engage a selected ratchet wheel to control the indexing of the numbering machine in the manner determined by the selected ratchet wheel, the characteristic feature that the ratchet wheels which are adapted to control a repetition of the same character a predetermined number of times are each provided with a mark opposite each deep tooth space, whereby a selected wheel may be set to a predetermined starting position with relation to the pawl, in order to assure that the repeating operation to be controlled by the wheel may start immediately at the starting of the numbering machine.

3. In a shifting device as claimed in claim 2, the further characteristic feature that the ratchet wheels adapted to control repeating operations of the numbering machine are provided with marks adapted to coincide with a predetermined portion of the pawl.

4. In a shifting device as claimed in claim 2, and wherein the ratchet wheels adapted to control repeating operations of the numbering machine are formed with shallow and deep spaces in predetermined order, and wherein feeding of the machine is effected only as the pawl engages a deep space, the further characteristic feature that the operating portions of said ratchet wheels are provided with marks adapted to indicate the engagement of the pawl into any of the deep spaces.

5. In a shifting device as claimed in claim 2, the further characteristic feature that said marks comprise recesses which are painted in a striking color.

CARL ANTON JOHANSSON.

REFERENCES CITED

The following references are of record in the file of this patent:

UNITED STATES PATENTS

| Number | Name | Date |
| --- | --- | --- |
| 986,338 | Wosinski | Mar. 7, 1911 |
| 1,100,773 | Perry | June 23, 1914 |
| 1,868,997 | Speicher | July 26, 1932 |